US009500389B2

(12) United States Patent
Coffey et al.

(10) Patent No.: US 9,500,389 B2
(45) Date of Patent: Nov. 22, 2016

(54) THERMALLY REGULATED SELF-HEATING CONTAINERS

(71) Applicant: HeatGenie, Inc., Austin, TX (US)

(72) Inventors: Brendan Coffey, Austin, TX (US); Krzysztof C. Kwiatkowski, Austin, TX (US); Brent C. Ford, Kyle, TX (US)

(73) Assignee: HEATGENIE, INC., Austin, TX (US)

( * ) Notice: Subject to any disclaimer, the term of this patent is extended or adjusted under 35 U.S.C. 154(b) by 0 days.

(21) Appl. No.: 15/133,319

(22) Filed: Apr. 20, 2016

(65) Prior Publication Data
US 2016/0305690 A1 Oct. 20, 2016

Related U.S. Application Data

(60) Provisional application No. 62/149,825, filed on Apr. 20, 2015.

(51) Int. Cl.
A47J 31/58 (2006.01)
F24J 1/00 (2006.01)
A47J 36/28 (2006.01)

(52) U.S. Cl.
CPC ........... F24J 1/00 (2013.01); A47J 36/28 (2013.01); A47J 31/58 (2013.01)

(58) Field of Classification Search
CPC ............. A24J 1/00; A47J 31/57; A47J 36/28
USPC ............. 126/263.01, 263.08, 263.04; 432/4, 432/206, 207; 122/509
See application file for complete search history.

(56) References Cited

U.S. PATENT DOCUMENTS

| 3,067,594 | A | | 12/1962 | Bland et al. | |
| 4,784,113 | A | * | 11/1988 | Nagai | A47J 36/28 126/263.09 |
| 6,267,110 | B1 | * | 7/2001 | Tenenboum | A47J 36/28 126/262 |
| 6,558,568 | B1 | | 5/2003 | Hayes | |
| 6,986,345 | B2 | * | 1/2006 | Kolb | A23L 3/02 126/263.08 |
| 2002/0129610 | A1 | | 9/2002 | Searle | |
| 2004/0206346 | A1 | * | 10/2004 | Tenenboum | B65D 81/3484 126/263.06 |
| 2004/0253397 | A1 | | 12/2004 | Hayes | |

(Continued)

FOREIGN PATENT DOCUMENTS

JP 03-218715 A 9/1991
JP 08-089409 A 4/1996

Primary Examiner — Gregory Huson
Assistant Examiner — Nikhil Mashruwala
(74) Attorney, Agent, or Firm — DuBois, Bryant & Campbell LLP; William D. Wiese

(57) ABSTRACT

A modular heating system and method is presented that automatically dissipates thermal energy from a heater or heated package if the energy cannot be assimilated without excessive temperature increase. A heater containing reactants that generate heat when combined is placed in thermal contact with a passive thermal control material which is in thermal contact with a container configured to contain a substance to be heated. The passive thermal control material allows the transmission of heat between the heater and the container as long as the temperature of the heat passing through the passive thermal control material does not exceed the activation temperature of the material. If the temperature of the heat passing through the passive thermal control material exceeds the material's decomposition temperature, the passive thermal control material decomposes and thereby dissipates heat.

19 Claims, 12 Drawing Sheets

(56) References Cited

U.S. PATENT DOCUMENTS

| | | | |
|---|---|---|---|
| 2007/0261692 A1* | 11/2007 | Bolmer | B65D 81/3484 126/263.01 |
| 2009/0078711 A1* | 3/2009 | Farone | A47J 36/28 220/592.22 |
| 2009/0287280 A1* | 11/2009 | Wong | A61F 7/034 607/96 |
| 2014/0127634 A1 | 5/2014 | Coffey et al. | |
| 2015/0017287 A1* | 1/2015 | Sevim | B65D 81/3484 426/109 |

* cited by examiner

| Example # | Normal Operation ||||| Empty Can ||||| Heat Only |||
|---|---|---|---|---|---|---|---|---|---|---|---|---|
| | t to 95% ΔT [min] | ΔT [°C] | Steam [s] | Steam Int | Heat Output [cal] | Tmax(metal) | Tmax(label) [°C] | Tmax(EO) [°C] | Steam | Tmax(bottom) [°C] | Tmax(8mm) [°C] | Tmax(15mm) [°C] |
| 1 | 04:07 | 34.1 | 0 | No | 7,799 | 119 | 118 | 112 | Med | 496 | 406 | 399 |
| 2 | 04:13 | 35.2 | 0 | No | 8,462 | 116 | 119 | 103 | Med | 523 | 427 | 447 |
| 3 | 04:04 | 33.8 | 0 | No | 8,191 | 125 | 121 | 126 | Med | 443 | 465 | 449 |
| 4 | 04:00 | 34.2 | 0 | No | 8,350 | 132 | 129 | 150 | Med | 453 | 444 | 453 |
| 5 | 04:10 | 34 | 0 | No | 7,893 | 128 | 125 | 150 | Med | 477 | 445 | 440 |
| 6 | 03:45 | 38.7 | 30 | Med | 7,398 | 134 | 136 | 160 | High | 579 | 441 | 462 |
| 7 | 03:45 | 32.5 | 0 | No | 7,763 | 105 | 101 | 82 | Med | - | 400 | 397 |
| 8 | 03:00 | 37 | 10 | Low | 9,382 | 167 | 178 | 208 | Med | 715 | 580 | 590 |
| 9 | 03:15 | 40.8 | 10 | Low | 9,294 | 218 | 218 | 190 | High | 420 | 595 | 633 |
| 10 | 01:25 | 41 | n/a | n/a | 9,820 | 257 | 257 | 300 | n/a | >1,000 | >1,000 | 900 |

*FIG. 9*

THERMALLY REGULATED SELF-HEATING CONTAINERS

PRIORITY STATEMENT UNDER 35 U.S.C. §119 & 37 C.F.R. §1.78

This non-provisional application claims priority based upon prior U.S. Provisional Patent Application Ser. No. 62/149,825 filed Apr. 20, 2015 in the name of Brendan Coffey and Krzysztof Kwiatkowski entitled "Thermally Regulated Self-Heating Containers," the disclosure of which is incorporated herein in its entirety by reference as if fully set forth herein.

BACKGROUND OF THE INVENTION

FIGS. 1A and 1B illustrate one form of a modular heater mounted in the base of a container such as a beverage can. The heater is dormant until activated. The heater is activated by pressing on its flexible lid 101 which in turn compresses a blister 102 which bursts to expel a tiny droplet of starting fluid onto a starting pellet. A spontaneous exothermic reaction 105 between the starting fluid and pellet generates heat which, as shown in FIG. 1B, initiates the main heating reaction that then propagates through the solid fuel mix. Thermal energy generated by the heater is transmitted through the contacting surfaces 110 of the heater and the beverage can wall to heat the package contents.

Various solid-state reaction chemistries may be used in the modular heater of this invention to provide a compact, lightweight, powerful heat source. The energy content and the heating rate are configurable via adjustments to the mass or composition of the internal fuel mix for use with different portion types or sizes.

Modular heaters that assemble into the base of containers to heat food and beverage contents contained therein to serving temperature are known in the art. For example, U.S. patent applications describe a compact modular heating element that inserts into the base of a food can or other container with technology related to the present invention: U.S. patent application Ser. No. 12/419,917 titled "Solid-State Thermite Composition Based Heating Device," U.S. patent application Ser. No. 12/570,822 titled "Package Heating Apparatus and Chemical Composition," U.S. patent application Ser. No. 12/715,330 titled "Package Heating Apparatus," U.S. patent application Ser. No. 13/177,502 titled "Package Heating Device and Chemical Compositions for Use Therewith," and U.S. patent application Ser. No. 14/073,639 titled "Heating Devices and Methods with Auto-Shutdown."

These heater elements efficiently store chemical energy in contained solid state chemical reactants and are simply activated, by pushing a button on its surface or other means, to promptly release thermal energy. The thermal energy is transmitted through the wall of an immediately adjacent container to uniformly heat the interior contents. The features and functionality of the heaters described in the foregoing applications, each of which was filed in the name of the present inventors, are incorporated into this application.

Intrinsic safety is essential for a mass consumer market and, in consumer packaged food and beverage products, a good general design guideline is that the container contents should typically not exceed preferred serving temperatures of about 60-70° C. (about 140-160° F.) and for user comfort and safety, no point on the exposed consumer contact surface of the package should exceed about 54° C. (130° F.) under reasonably anticipated consumer use or misuse conditions.

In normal operation, by design the energy of the heater is safely transmitted to the food or beverage portion in the container. However, if the food portion is not present to act as a heat sink (for example, the package contents were spilled before starting the heater) then, without some overriding mechanism, the empty package would reach unacceptably high temperatures. Similarly, a heater removed from the package and thus without a heat sink could reach extreme temperatures.

Thus, in certain circumstances it is desirable to provide a responsive means of moderating the heating process to prevent overheating of the package assembly or the food or beverage products and protect users against burns. There is a need, therefore, for effective and efficient passive thermal control systems for stopping initiated heating devices from heating beyond their intended limit.

SUMMARY OF THE INVENTION

Embodiments of the present invention incorporate a passive thermal cooling system and method into a modular heater to provide for greater safety such that, if the heater is activated when not in direct contact with an appropriate heat sink (for example a filled container), it will safely dissipate excess energy away from the system. More specifically, a heater containing reactants that generate heat when combined is placed in thermal contact with a passive thermal control material which, in turn, is placed in thermal contact with a container configured to contain a substance to be heated. The passive thermal control material allows the transmission of heat between the heater and the container as long as the temperature of the heat passing through the passive thermal control material does not exceed the activation temperature of the material. If the temperature of the heat passing through the passive thermal control material exceeds the material's decomposition temperature, the passive thermal control material decomposes and thereby dissipates heat.

In practice, the substance in the container will act as a heat sink and heat will flow through the passive thermal control material to the substance without raising the temperature of the passive thermal control material above its decomposition temperature. However, if the container is empty and there is no heat sink to absorb the heat being generated by the heater, the temperature in the passive thermal control material will exceed its thermal decomposition temperature and will dissipate excess thermal energy and thereby moderate the temperature of the heater and container.

The present invention provides PTC functionality within the heater device. The PTC functionality only acts when the absence of the heat sink is "sensed" as excessive internal temperature build-up within the heater caused by the inability to effectively transfer the heat being generated. The PTC is thus a form of "intelligent" or "smart" packaging, that is it involves the ability to sense or measure an attribute of the product and trigger active packaging functions.

The foregoing has outlined rather broadly certain aspects of the present invention in order that the detailed description of the invention that follows may better be understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 9 is a tabled listing of experimental parameters used and results obtained for numbered example embodiments;

DETAILED DESCRIPTION

Figure 1B:
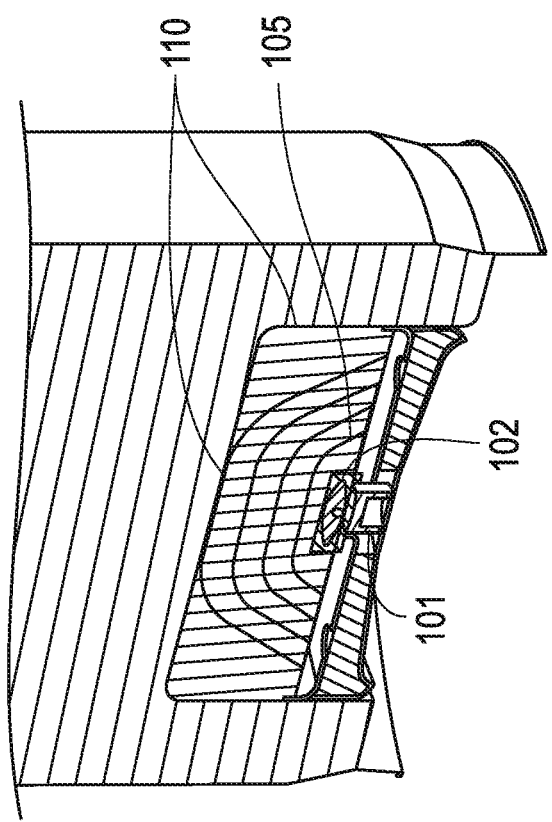
FIG. 1B is a cross-sectional view of a modular heater in the base of a filled beverage container after initiation of the heater.
Figure 1A:
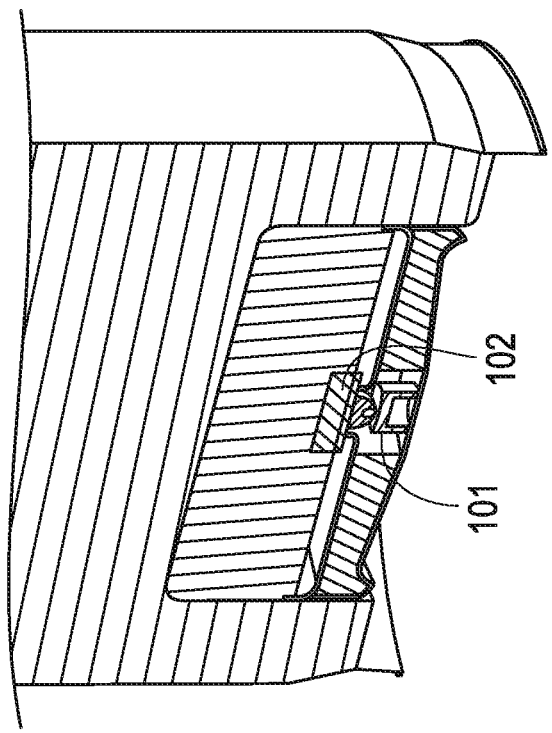
FIG. 1A is a cross-sectional view of a modular heater in the base of a filled beverage container prior to initiation of the heater.

The present invention is directed to an apparatus and method for providing passive thermal control capability to a heating device. The configuration and use of the presently preferred embodiments are discussed in detail below. It should be appreciated, however, that the present invention provides many applicable inventive concepts that can be embodied in a wide variety of contexts other than devices for heating food and beverages. Accordingly, the specific embodiments discussed are merely illustrative of specific ways to make and use the invention, and do not limit the scope of the invention. In addition, the following terms shall have the associated meaning when used herein:

"container" means and includes any receptacle in which material may be held or carried, including without limitation a can, carton, bowl, jar or other receptacle; and "heater" means and includes any device in which reactants react to generate heat.

As will be apparent to those skilled in the art, many of the heating devices are depicted herein without each and every component required for full functionality, such as, for example, devices shown without a flexible actuating lid or a blister assembly. In each case the depiction is intended to show the functional aspects of the heater for a better understanding of the invention and should not necessarily be construed as including all of the elements of a fully operational device.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. The present specification is intended to be taken as a whole and interpreted in accordance with the principles of the present invention as taught herein and understood to one of ordinary skill in the art.

Figure 2B:
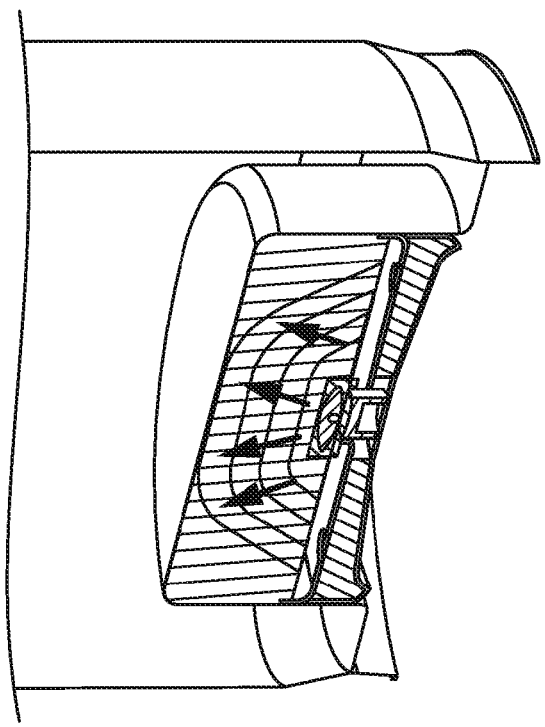
FIG. 2B is a cross-sectional view of a modular heater showing trapping of thermal energy within the activated heater in an unfilled container (no heat sink)
Figure 2A:
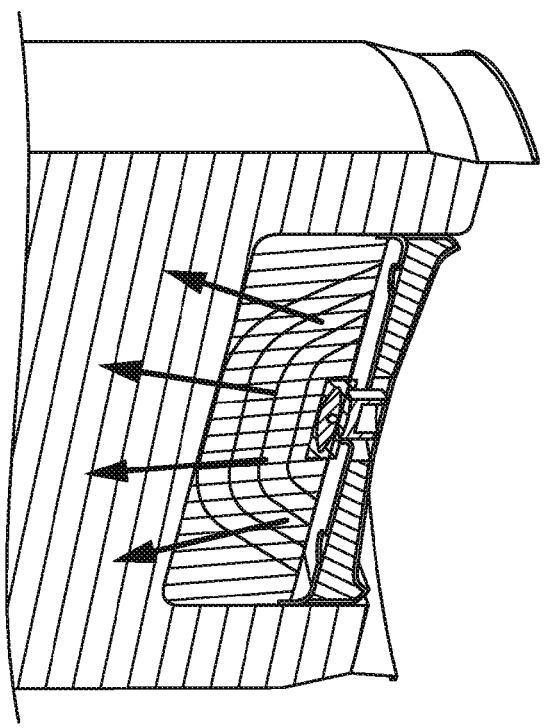
FIG. 2A is a cross-sectional view of a modular heater showing transmission of thermal energy of the activated heater to the filled container contents (heat sink)

Referring now to FIGS. 2A and 2B, wherein the heater is activated, thereby enabling it to transmit thermal energy through its interior and then externally through the heater wall. If the heat transmitted to the package is steadily transmitted to a surrounding fluid coolant as shown in FIG. 2A, then the design interior temperature profile of the heater is established. If the coolant is not present as shown in FIG. 2B, the energy cannot be as readily transmitted and the interior temperature of the heater reaches a much higher level. The interior temperature of the active heater thus effectively provides a means of "sensing" the presence or absence of an adjacent heat source which may constitute an untoward hazardous condition.

If a sufficient heat sink is not present, and higher than normal temperatures build up inside the heater, methods and systems presented herein will activate a passive thermal control (PTC) mechanism to dissipate excess thermal energy and thereby moderate the temperature of the heater and package.

Knowing the thermal characteristics of the normally present heat sink (fluid contents of the package) is useful in defining the cooling requirements of the PTC mechanism for the intended application. For example, an efficient solid state heater that raises the temperature of 240 mL of a beverage by 40° C. in two minutes delivers about 40 kJ of energy to the liquid at an average power output of approximately 650 Watts. The high heat capacity of water (4.18 J/g-° C.) relative to many other substances translates to a relatively small sensible temperature rise of the fluid contents from this powerful energy flux.

If PTC functionality is to be achieved by introducing new components into the heater in a mass efficient way, then the added components must have a higher total specific heat absorption capacity, relative to the normally present heat sink. In addition to its high specific heat capacity, another distinctive property of water is its high latent heat of vaporization (2260 J/g). It can be shown that summing the requisite latent and sensible heat of water, under closed adiabatic conditions, the example 40 kJ heater above would only convert less than 16 g of water to steam, resulting in a final temperature of the complete system of only about 100° C. In an open system, the steam of this example (occupying less than 20 liters under ambient conditions) can escape under its own pressure carrying away its high energy content. This example illustrates how a relatively small mass of material can have a large cooling effect by absorbing heat and being expelled from the system.

There are significant practical difficulties associated with directly incorporating and isolating fluid water in a solid-state heater. Even a partial pressure of water vapor inside the heater could cause side reactions with the components of the fuel/oxidizer reactant mixture. In fluid form water could leak internally to or outside of the heater. Thus, it may be preferable to have no free water in liquid form inside the solid state heater. Certain inorganic compounds and salts, in dry solid form contain significant levels of bound water, which they release as vapor on heating above a characteristic threshold decomposition temperature, with large endothermic energy absorption. Some examples of these materials are given in Table 1.

TABLE 1

Properties of Some Hydrated Inorganic Compounds

| Material | Formula | Mol. Wt. | H2O Content (%) | Decomp. Temp. (° C.) |
|---|---|---|---|---|
| Hydrated Potassium Aluminium Sulfate (ALUM) | KAl(SO4)2 12H2O | 474.36 | 45.5 | 92-93 |
| Aluminum Hydroxide (Alumina Trihydrate, ATH) | Al(OH)3 | 78.00 | 34.6 | >200 |
| Sodium Phosphate Tribasic Dodecahydrate (SPT) | Na3(PO4)2 12H2O | 379.94 | 56.9 | >80 |

These materials contain chemically bound rather than absorbed or free water and thus provide a "dry" method of introducing materials with higher total specific heat absorption capacity for passive thermal control. Selecting a material with a preferred threshold temperature for decomposition can be beneficial in controlling the conditions under which PTC is activated.

There are other endothermically decomposing chemical compounds, that is materials that are thermally decomposed to release gases and absorb energy at various activation temperatures and, in certain embodiments might also be used as thermally responsive materials for passive thermal control of a chemical heater. Endothermic decomposition is inherent in a broad range of common and low-cost materials. These include: magnesium and aluminum hydroxides, together with various hydrates and carbonates. Many of these compounds, when thermally decomposed, give off carbon dioxide and/or water as gaseous byproducts.

We have previously described how an endothermically decomposing compounds, when heated to a certain threshold temperature, can rapidly decompose to release a volume of gas, the energy of which does work to effect a mechanical auto-shutdown of a heater device. Simply allowing these gases to be discharged from the heater will also produce cooling.

As the examples below show, passive thermal control functionality can be achieved by introducing the materials described in Table 1 or analogous material components in certain regions of the heater device structure. Basing a passive thermal control mechanism operation on a material's physical property responses to temperature, rather than the actuation of mechanical elements improves system reliability, and can be accomplished simply and with low cost. A thermodynamically defined response coupled to a transmissible energetic fluid is inherently a highly reliable way of delivering a passive response.

Figure 3:
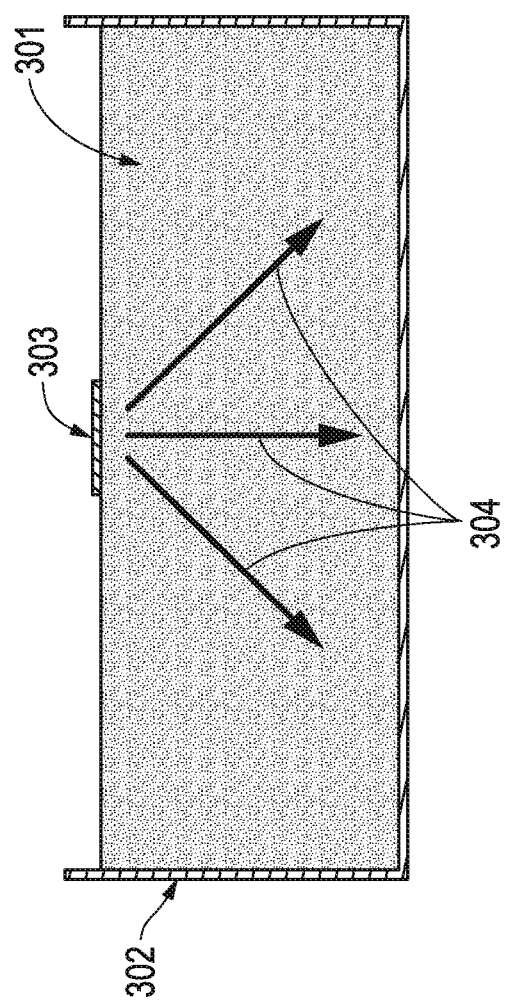
FIG. 3 is a diagrammatic cross-sectional view of a solid-state modular heater without internal components for passive thermal control functionality.

FIG. 3 shows a diagram of a heater construction of prior art without passive thermal control functionality. In this configuration, the pre-mixed fuel-oxidizer reaction mix 301 is housed in the base of the cylindrical heater cup 302. The mixture of reactants 301 is ignited near its center by various means known in the art such as, for example, a starting pellet 303. The energy producing chemical reaction proceeds internally to the heater as a solid flame front. As shown in FIG. 3, the reaction pathway 304 spreads generally radially outward from the starting pellet 303, continuing to propagate throughout the interior until the entire mixture of reactants 301 has reacted to generate the full energy content of the heater.

Figure 4:
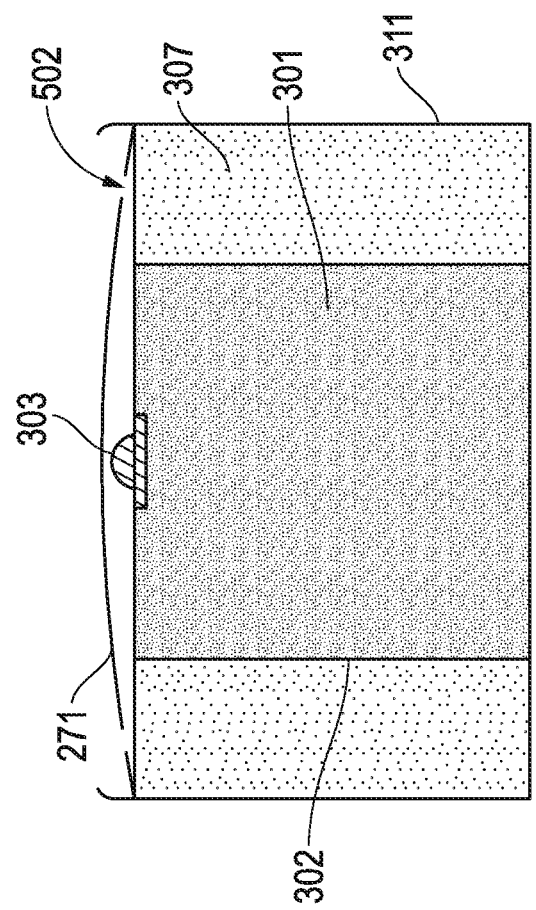
FIG. 4 is a diagrammatic cross-sectional view of a solid state modular heater with internal components for passive thermal control functionality.
Figure 5:
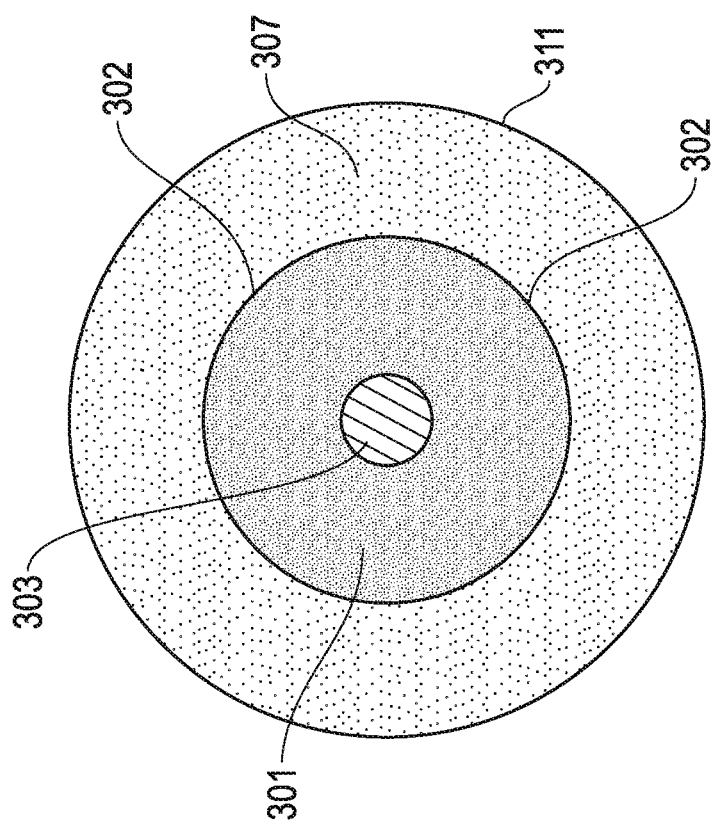
FIG. 5 is a plan view of the modular heater of FIG. 4. with the lid removed to show internal components.

FIG. 4 and FIG. 5 show one embodiment of the current invention wherein passive thermal control functionality is incorporated within a modified heater design. In this embodiment, passive thermal control regulation becomes an onboard property of the heater, invocable whether the heater is bare or installed in an empty container. In FIGS. 4 and 5, the basic solid state heater design of FIG. 3 is retained now as the core structure of a device, surrounded by an "active" passive thermal control layer 307 packed between the heater cup wall 302 and the outer wall 311 of the heater device. Here the term "active" refers to the physical (heating and phase change) and/or chemical (thermal decomposition) responsiveness of the material comprising the active passive thermal control layer 307. Note that the Figures do not represent the relative scale of the features shown and in practical implementations the additional surrounding thermal control layer 307 and outer wall 311 are chosen by design to be thin and comprised of materials with good thermal conductivity to minimize their combined thermal resistance to heat flow. The actuating container lid 271 spans and encloses both the fuel matrix 301 and thermally transmissive PTC layer 307 regions, and has a vent 502 to release vapor as needed when PTC is actuated.

Figure 6:
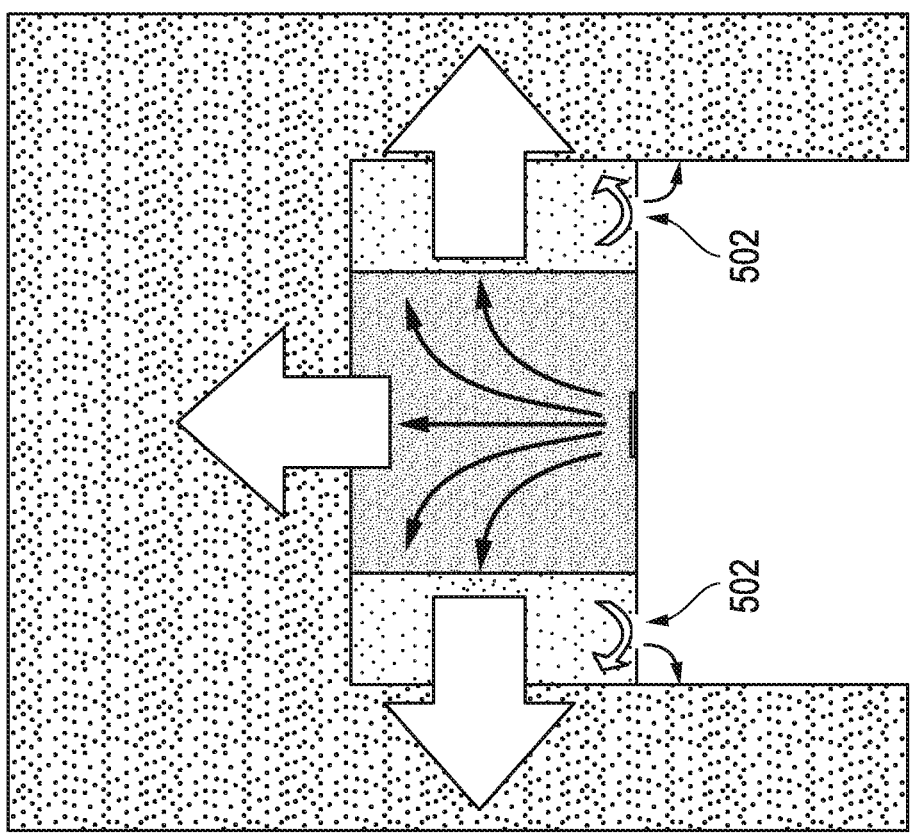
FIG. 6 is a diagrammatic cross-sectional view of a filled self-heating container with an activated modular heater incorporating passive thermal control.

FIG. 6 is a vertical cross-sectional view of the lower portion of a filled self-heating container with an activated modular heater incorporating passive thermal control installed in its base demonstrating the action of the PTC mechanism during normal operation (a filled beverage can).

Since the can is filled, the fluid acts as a thermal sink carrying heat away from the interface. With a good heat transfer coefficient for flow of thermal energy into the beverage the thermal energy of the heater is transmitted through the PTC layer, minimizing energy accumulation and temperature build up in this region. The bulk of the PTC layer material is kept below the decomposition temperature at which water is driven from the matrix. Although there may be some small partial degree of decomposition, overall there is no significant endothermic activity generating gasses or vapors and dissipating heat out of the system.

Figure 7:
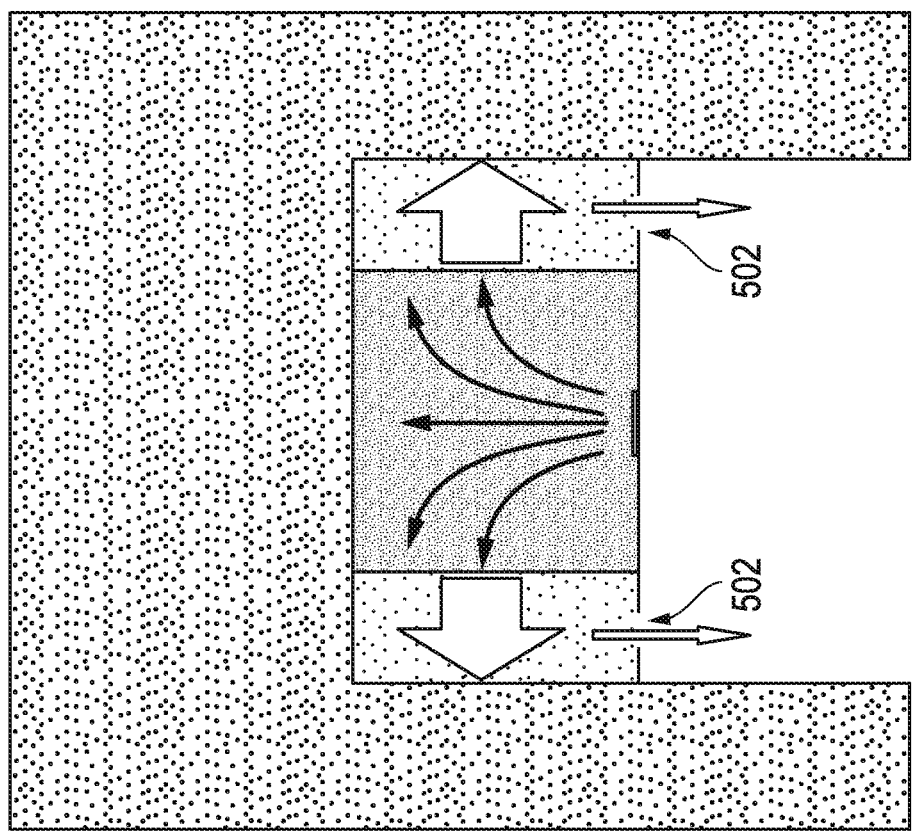
FIG. 7 is a diagrammatic cross-sectional view of an empty self-heating container with an activated modular heater incorporating passive thermal control.

FIG. 7 is a vertical cross-sectional view of the lower portion of an empty self-heating container with an activated modular heater incorporating passive thermal control installed in its base demonstrating the action of the passive thermal control mechanism during out of range conditions (empty beverage can). Under these conditions the empty can acts as thermal barrier and energy released by the heater accumulates in the PTC layer and the heater core. Thermal decomposition of a major portion of the active material of the PTC layer takes place and water vapor (steam) is expelled from the heater vents and away from the package.

Allowing the steam generated to be emitted away from the heater and the heated package thereby removes significant energy from the system and can produce a very large cooling effect for a substantial reduction of the overall temperature of the system compared to the temperatures that would be realized in the absence of passive thermal control. While steam level temperatures may be present in the region of the low volume of emitted steam, this is substantially less hazardous than the extreme temperature excursions that might otherwise occur.

Figure 8:
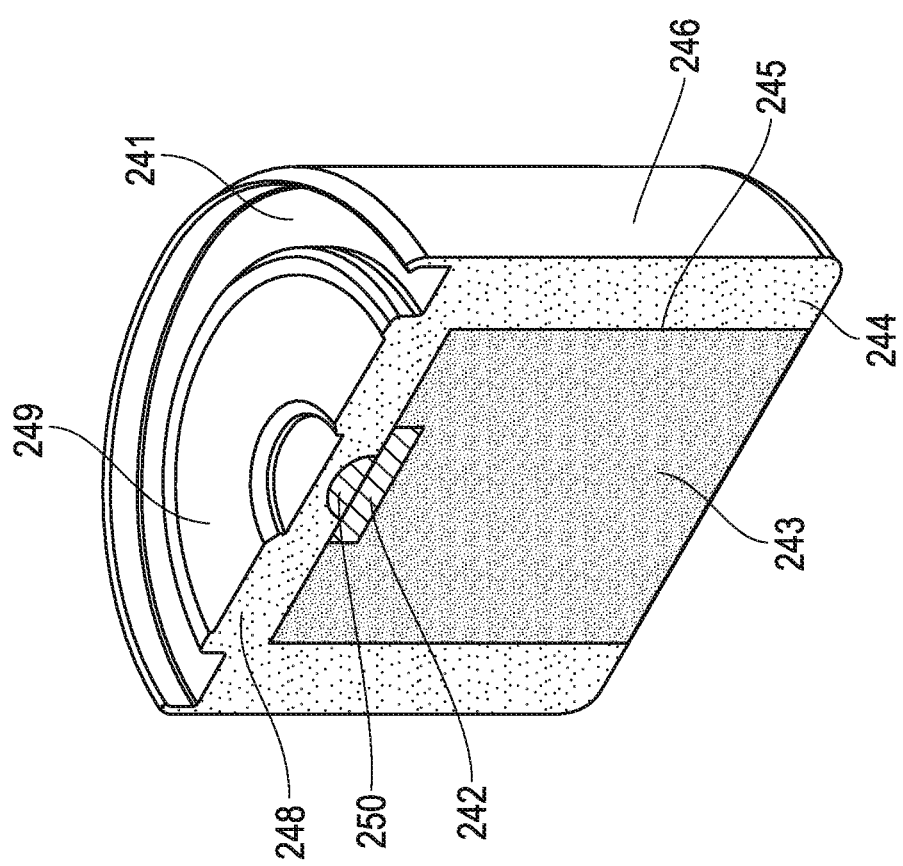
FIG. 8 is a view of a cross section solid state modular heater for practical demonstration of passive thermal control.

FIG. 8 shows a vertical cross section view of one embodiment of a solid state modular heater used for practical demonstration of passive thermal control in the examples that follow. In the following Examples 1 through 7, 11 g of a passive thermal control mix 244 is compacted in the annular space between the 25 mm metal heater cup 245 and an outer metal cup 246 that encloses the heater. In examples 8 and 9 the mass of passive thermal control mix used is 9 g. The formulations of the PTC mix used are given below and in FIG. 9. In Example 10 the passive thermal control mix 244 and inner heater cup 245 are not included, so as to provide a basis for comparison.

In each of the following Examples 1 through 7, 21 g of heat-generating fuel/oxidizer formulation 243 is compacted into the inner heater cup 245. In examples 8 and 9 the mass of passive thermal control mix used is 24 g. In example 10, 21 g of heat-generating fuel/oxidizer formulation 243 is compacted into the outer heater cup 246. Although other formulations could be used, the heat-generating formulation 243 used in these examples is a mixture containing 15-25% aluminum, with particle size of 2-30 microns, 20-30% silicon dioxide, 25-45% alumina, and additives and reaction aids such as potassium chlorate, calcium fluoride, and barium peroxide.

An initiating pellet 242 is pressed centrally into the surface of the fuel/oxider mix 243, and a heater activation mechanism 250 is placed on top of the pellet 242 and covered with insulator 248 and actuator button 249. A metal lid 241 is crimped onto the outer cup 246. The heater module thus assembled was installed into the base of beverage can for testing. Temperature time profiles for can bottom, middle, and top temperatures were recorded. The flux of steam (if any) emitted was noted. Each example heater configuration was tested with a beverage can containing 288 mL of water as well as with an empty beverage can. Bare heater modules were also tested. FIG. 9 is a tabled listing of experimental parameters used and results obtained for the following numbered example embodiments.

Example 1—Calcium Hydroxide/Potassium Alum (50:50) mixture is used for the PTC layer formulation.

Example 2—Calcium Hydroxide mixture is used for the PTC layer formulation.

Example 3—Calcium Hydroxide: Alumina (50:50) mixture is used for the PTC layer formulation.

Example 4—Calcium Hydroxide: anhydrous Calcium Sulfate (50:50) mixture is used for the PTC layer formulation.

Example 5—Calcium Hydroxide: Calcium Sulfatex semihydrate (50:50) mixture is used for the PTC layer formulation.

Example 6—Calcium Oxide: Potassium Alum (50:50) mixture is used for the PTC layer formulation.

Example 7—anhydrous Calcium Sulfate:Potassium Alum (50:50) mixture is used for the PTC layer formulation.

Example 8—This example is a modification of Example 1 using 34 mm diameter heater cup 245 9 g of Calcium Hydroxide/Potassium Alum (50:50) mixture as the PTC layer formulation 244, and 24 g of fuel/oxidizer mix 243.

Example 9—This example is a modification of Example 1 using 34 mm diameter heater cup 245 9 g of Calcium Oxide/Potassium Alum (50:50) mixture as the PTC layer formulation 244, and 24 g of fuel/oxidizer mix 243.

Example 10—In this control configuration the inner heater cup 245 and the PTC layer 244 are not present.

Figure 10:
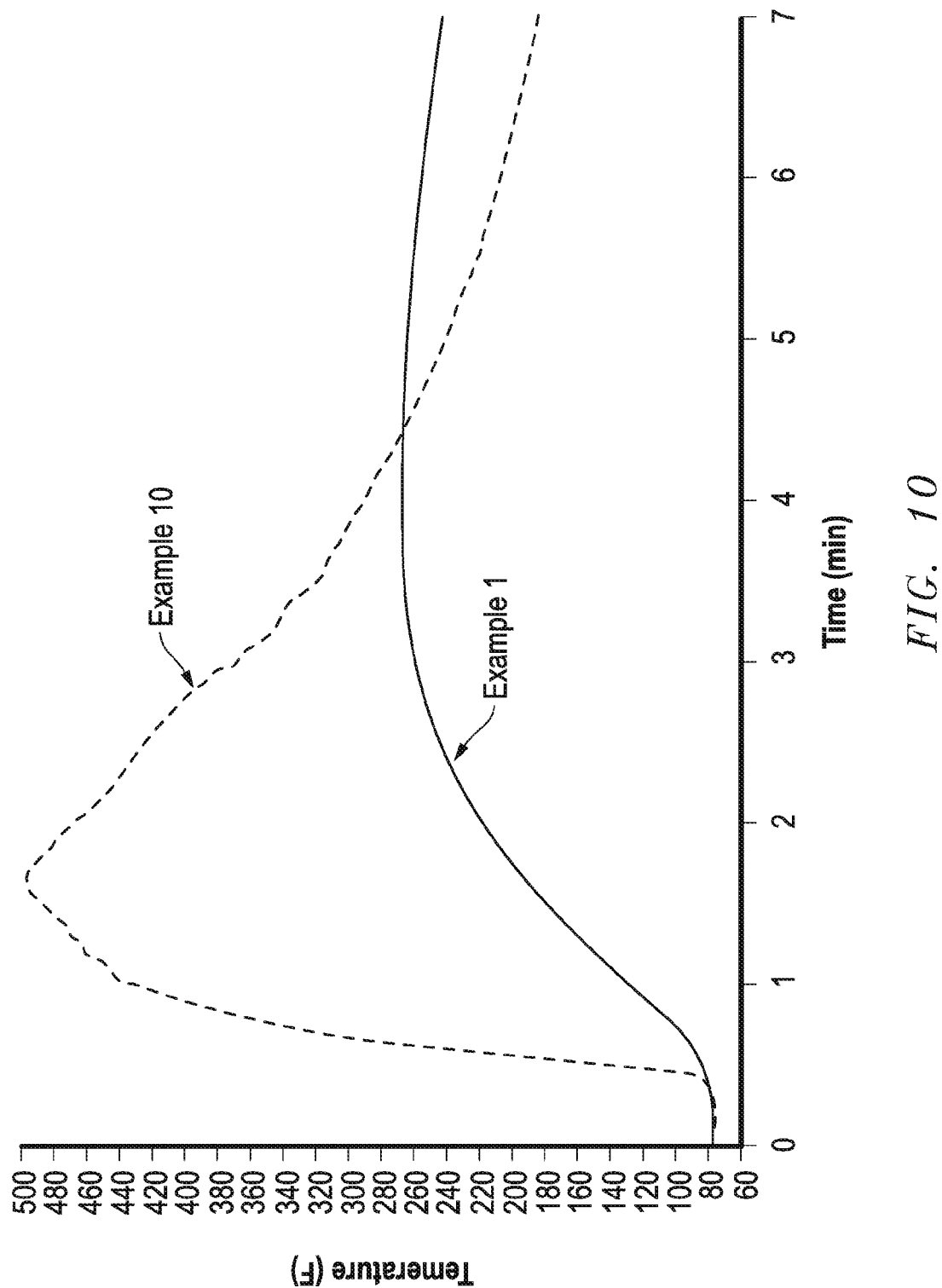
FIG. 10 is a graph showing the time/temperature response for activated heaters (with and without passive thermal control in an empty container.

FIG. 10 is a graph showing the time/temperature response for activated heaters of Example 1 (with passive thermal control) and Example 10 (without passive thermal control) in an empty container. The temperature plotted in FIG. 10 is the surface temperature of the metal can at its midpoint. FIG. 10 demonstrates that the surface temperature of the Example 10 heater (no PTC) increases to a peak temperature of nearly 500° F. within 2 minutes, whereas the surface temperature of the Example 1 heater incorporating PTC increases at a lower rate and to a more bounded maximum temperature of about 220° F.

Figure 11:
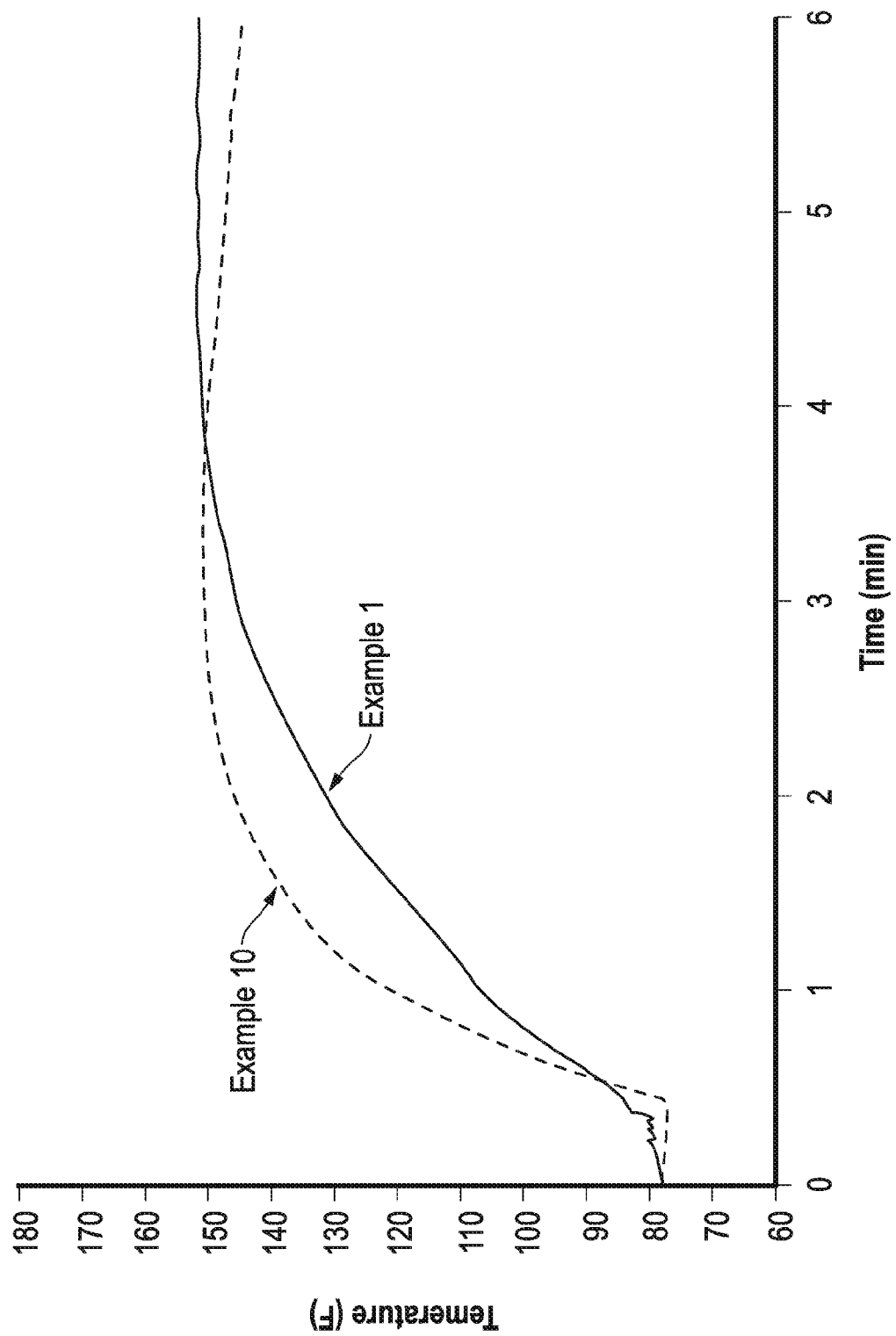
FIG. 11 is a graph showing the time/temperature response for activated heaters (with and without passive thermal control in a filled container.

FIG. 11 is a graph showing the time/temperature response for activated heaters of Example 1 (with passive thermal control) and Example 10 (without passive thermal control) in a filled container. The temperature plotted in FIG. 11 is the surface temperature of the metal can at its midpoint. Both Example 1 and Example 10 heaters deliver the same endpoint product target temperature of 140° F., although the heating rate is slightly lower for the Example 1 heater.

Comparing the temperature response from FIG. 10 and FIG. 11 of the Example 1 heater in the unfilled and filled can conditions shows that the PTC cooling embodiment does not cause undesired cooling in normal operation of filled package heating but is selectively activated in the empty package to produce highly effective cooling.

In order to practically achieve passive thermal control according to the principles described, some system development and optimization is needed. By design PTC is incorporated into a device whose normal function is heating and PTC cannot interfere with that functionality. But it must also reliably perform efficient cooling in a safe way when that response is needed. PTC should not unduly burden the heater with mass or complexity.

Heater design and material selection for the PTC layer are two factors that can be used to achieve appropriate PTC functionality for a heater device. Locating the PTC layer between the core heat generating source and adjacent to the outermost wall of the heater sets up a thermal energy balance that enables sensing and actuation PTC mechanism. The rate of heat transfer is dependent upon, and may be adjusted through, physical parameters of the system such as: geometry of component parts, particle size and density of mix, material thermal properties, and heat transfer coefficients. The inner heater cup wall may be formed from a thin foil to provide a chemical barrier with minimal thermal resistance.

The active component of the PTC layer is a material with a high chemically bound water content that when heated above some characteristic threshold temperature decomposes releasing molecular water that further heating converts to steam. The energy absorbed by thermal decomposition and the phase change of water vaporization allows for a relatively small mass to absorb a large quantity of energy and lower the system temperature significantly.

While many other compounds could be used, some examples of suitable active materials are given in Table 1.

Each has its own characteristic thermal response. For example aluminum hydroxide contains 1.5 waters of hydration per molecule all of which is rapidly released in a single decomposition step, whereas potassium alum contains 12 waters of hydration per molecule which are sequentially released in a multi-step decomposition reaction process. Potassium alum also has a band of increasing onset temperatures for thermal decomposition of each additional water molecule and this combination of properties produces a time-release response with a low steady flux of steam.

As illustrated in examples 1 through 9, the PTC formulation may be comprised of a single chemical component or could also be a mixture of several different materials, some which may have PTC character combined with others that are inert in this regard. Low cost, environmentally friendly, and consumer safe materials are preferred.

Some mass of inert material mass may be in the PTC layer to buffer temperature and moderate the rate of thermal decomposition. Inert additives can also beneficially increase the thermal conductivity of the PTC layer to enhance its transmission of thermal energy, although the PTC layer may also be designed to provide some lowering of the thermal flux. Varying the particle size and density of the packed PTC layer can be used to regulate the timing and volume of heated vapors from the layer.

The PTC layer itself must have a selective, tuned, and controlled response. The PTC response characteristics of the various PTC layer compositions of Examples 1 through 10 are described in the Table of FIG. 9. Columns 2 through 6 of FIG. 9 show how in normal heating mode, the: heating time, maximum temperature of the heated fluid, time and quantity of steam released and useful energy content may vary with composition. Generally a shorter heating time with maximum heat transfer efficiency, minimal thermal decomposition and release of steam are preferred.

Columns 7 through 10 of FIG. 9 show how in an empty can, the temperatures at various points on the surface of the metal container (bottom, middle, top) and the volume of steam released may vary with composition. Generally lower surface temperatures and moderate steam flux is preferable.

Columns 11 through 13 of FIG. 9 show how for a bare heater, the temperatures at various points on its surface (bottom, middle, top) may vary with composition. In this condition, again lower surface temperatures are preferable.

The PTC of the present invention does not substantially detract from or negate the existing beneficial characteristics of the self-heating technology of this invention and prior inventions, so that the heater device construction will remain relatively small, simple, robust, easy to manufacture, and economically low-cost. Embodiments of the present invention also provide a controllable output that enables, for example, designing in a defined acceptable maximum temperature realized at the surfaces of the heater or the package in which it may be contained.

The heater in various embodiments is designed to allow safe and gentle release of excess pressure when passive thermal control is activated. For example, the crimped seal between the heater cup and lid may be designed to stress relieve slightly to bleed off pressure through the seal. The heater construction may provide for any emitted gas streams to be filtered through a porous insulator so there is no emergent steam or particulates.

Figure 12:
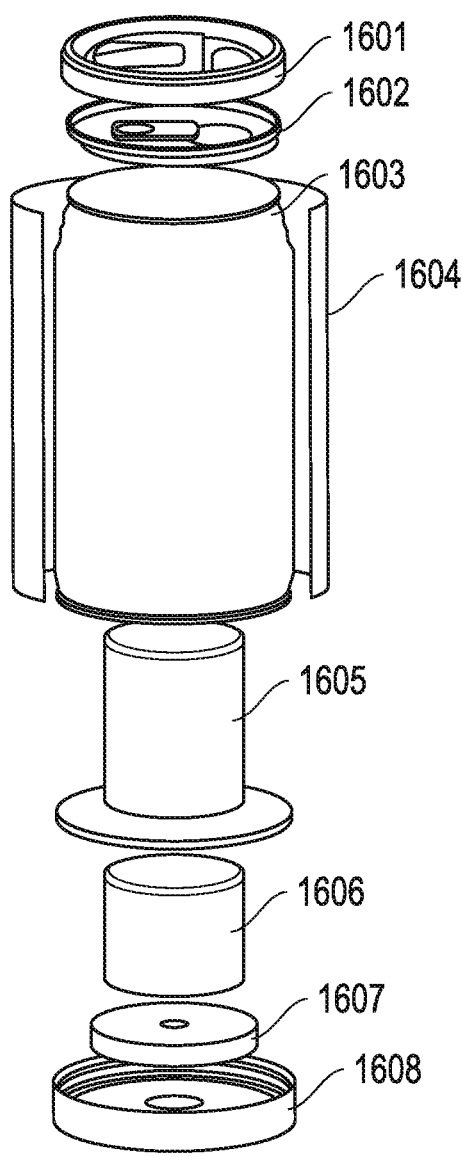
FIG. 12 shows an exploded view of one embodiment of the heater of the present invention installed in a container.

The complete self-heating package described herein consists of additional components besides the modular solid state heater. One embodiment of a complete package assembly is shown in FIG. 12. In these examples, the self-heating package is a 3-piece nominal 12 oz. beverage container. However, embodiments of the invention may alternatively be realized with a 2-piece beverage container or other package forms.

Referring to FIG. 12, the can body 1603 and top end 1602, consisting of, in at least one embodiment, an easy opening lid for convenience, are conventional can package components. The non-easy-opening (NEO) end 1605 is specifically designed for mechanical and thermal interfacing of the package and heater. An insulating plastic lip guard 1601 and paper or plastic thermal label 1604 provide thermal safety. Once the heater is installed in the NEO, there are additional components at the heated end of the can; these may include an external insulator 1607 which may be a non-woven polymer or fiberglass mat and a plastic base cap 1608. The external insulator may also incorporate materials such as activated carbon or baking soda to absorb any trace odors emitted by the activated heater. For effective implementation of passive thermal control, these components must be implemented, for example be porous or vented, so as to allow heated gases and vapors to be readily and safely discharged from the package and carrying away thermal energy.

While the present device has been disclosed according to the preferred embodiment of the invention, those of ordinary skill in the art will understand that other embodiments have also been enabled. Even though the foregoing discussion has focused on particular embodiments, it is understood that other configurations are contemplated. In particular, even though the expressions "in one embodiment" or "in another embodiment" are used herein, these phrases are meant to generally reference embodiment possibilities and are not intended to limit the invention to those particular embodiment configurations. These terms may reference the same or different embodiments, and unless indicated otherwise, are combinable into aggregate embodiments. The terms "a", "an" and "the" mean "one or more" unless expressly specified otherwise.

When a single embodiment is described herein, it will be readily apparent that more than one embodiment may be used in place of a single embodiment. Similarly, where more than one embodiment is described herein, it will be readily apparent that a single embodiment may be substituted for that one device.

In light of the wide variety of possible heating methods and systems available, the detailed embodiments are intended to be illustrative only and should not be taken as limiting the scope of the invention. Rather, what is claimed as the invention is all such modifications as may come within the spirit and scope of the following claims and equivalents thereto.

None of the description in this specification should be read as implying that any particular element, step or function is an essential element which must be included in the claim scope. The scope of the patented subject matter is defined only by the allowed claims and their equivalents. Unless explicitly recited, other aspects of the present invention as described in this specification do not limit the scope of the claims.

What is claimed is:

1. A thermally-regulated container, comprising:
   a container configured to contain a substance to be heated;
   a reaction chamber containing reactants that generate heat when combined;
   a passive thermal control material positioned between the reaction chamber and the container, wherein the reaction chamber is in thermal contact with the passive thermal control material and the passive thermal control material is in thermal contact with the container;

wherein the passive thermal control material allows heat to pass therethrough prior to reaching the passive thermal control material's decomposition temperature and, if a heater exceeds the passive thermal control material's decomposition temperature, the passive thermal control material decomposes and thereby dissipates heat, and wherein at least a portion of the reaction chamber is located inside the container and the passive thermal control materials is positioned between the container and at least some of the portion of the reaction chamber that is located inside the container.

2. The container of claim 1, wherein the passive thermal control material has a higher total specific heat absorption capacity than the substance to be heated.

3. The container of claim 1, wherein the passive thermal control material is potassium alum.

4. The container of claim 1, wherein the passive thermal control material comprises potassium alum and calcium hydroxide.

5. The container of claim 1, wherein the reactants are solid state reactants.

6. The container of claim 1, wherein the substance to be heated is a food product.

7. The container of claim 1, wherein a byproduct of the decomposition is water and heat is dissipated through the formation of steam.

8. A method of controlling heat in a container, comprising:
locating a heater in thermal contact with a passive thermal control material;
placing the passive thermal control material in thermal contact with a container configured to contain a substance to be heated, wherein the passive thermal control material allows the transmission of heat from the heater to the container until such time as the passive thermal control material reaches its decomposition temperature and, if the passive thermal control material exceeds its decomposition temperature, the passive thermal control material decomposes and thereby dissipates heat, a reaction chamber containing reactants that generate heat when combined, and wherein at least a portion of the reaction chamber is located inside the container and the passive thermal control materials is positioned between the container and at least some of the portion of the reaction chamber that is located inside the container.

9. The method of claim 8, wherein the passive thermal control material has a higher total specific heat absorption capacity than the substance to be heated.

10. The method of claim 8, wherein the passive thermal control material is potassium alum.

11. The method of claim 8, wherein the passive thermal control material comprises potassium alum and calcium hydroxide.

12. The method of claim 8, wherein the substance to be heated is a food product.

13. The method of claim 8, wherein a byproduct of the decomposition is water and heat is dissipated through the formation of steam.

14. A container, comprising:
a container configured to contain a substance to be heated;
a heater in thermal contact with a passive thermal control material, the passive thermal control material being in thermal contact with the container;
wherein the passive thermal control material allows the transmission of heat from the heater to the container until such time as the passive thermal control material reaches its decomposition temperature and, if the passive thermal control material exceeds its decomposition temperature, the passive thermal control material decomposes and thereby dissipates heat, a reaction chamber containing reactants that generate heat when combined, and wherein at least a portion of the reaction chamber is located inside the container and the passive thermal control materials is positioned between the container and at least some of the portion of the reaction chamber that is located inside the container.

15. The container of claim 14, wherein the passive thermal control material has a higher total specific heat absorption capacity than the substance to be heated.

16. The container of claim 14, wherein the passive thermal control material is potassium alum.

17. The container of claim 14, wherein the passive thermal control material comprises potassium alum and calcium hydroxide.

18. The container of claim 14, wherein the substance to be heated is a food product.

19. The container of claim 14, wherein a byproduct of the decomposition is water and heat is dissipated through the formation of steam.

* * * * *